United States Patent
Banerjee et al.

(10) Patent No.: US 9,886,081 B2
(45) Date of Patent: Feb. 6, 2018

(54) MANAGING POWER-DOWN MODES

(71) Applicant: QUALCOMM Incorporated, San Diego, CA (US)

(72) Inventors: Sarbartha Banerjee, Bangalore (IN); Rakesh Misra, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 102 days.

(21) Appl. No.: 15/010,237

(22) Filed: Jan. 29, 2016

(65) Prior Publication Data
US 2017/0075408 A1 Mar. 16, 2017

(51) Int. Cl.
G06F 1/00 (2006.01)
G06F 1/32 (2006.01)

(52) U.S. Cl.
CPC ............ G06F 1/3287 (2013.01); G06F 1/324 (2013.01); G06F 1/3293 (2013.01); G06F 1/3296 (2013.01); Y02B 60/1217 (2013.01); Y02B 60/1282 (2013.01); Y02B 60/1285 (2013.01)

(58) Field of Classification Search
CPC ...... G06F 1/3287; G06F 1/324; G06F 1/3293; G06F 1/3296; Y02B 60/1217; Y02B 60/1282; Y02B 60/1285
See application file for complete search history.

(56) References Cited

U.S. PATENT DOCUMENTS

| | | | |
|---|---|---|---|
| 7,287,170 B2 | 10/2007 | Sadowski | |
| 7,337,334 B2 | 2/2008 | Kuhlmann et al. | |
| 7,380,038 B2 | 5/2008 | Gray et al. | |
| 8,990,604 B2 | 3/2015 | Patel | |
| 2001/0052800 A1 | 12/2001 | Mizuno | |
| 2004/0123172 A1 | 6/2004 | Sheller | |
| 2009/0172423 A1 | 7/2009 | Song et al. | |
| 2010/0268917 A1 | 10/2010 | Nation et al. | |
| 2012/0072746 A1 | 3/2012 | Sotomayor | |
| 2013/0086395 A1 | 4/2013 | Liu | |
| 2013/0103956 A1 | 4/2013 | Murakami | |
| 2014/0164794 A1 | 6/2014 | Alshinnawi et al. | |
| 2014/0317356 A1 | 10/2014 | Srinivasan et al. | |

(Continued)

FOREIGN PATENT DOCUMENTS

| | | |
|---|---|---|
| EP | 2587366 A1 | 5/2013 |
| EP | 2818963 A1 | 12/2014 |

(Continued)

OTHER PUBLICATIONS

Partial International Search Report—PCT/US2016/049504—ISA/EPO—dated Feb. 10, 2017.

(Continued)

*Primary Examiner* — Xuxing Chen
(74) *Attorney, Agent, or Firm* — Arent Fox, LLP

(57) ABSTRACT

An apparatus includes a first circuit configured to receive one or more requests from a plurality of cores. Each of the one or more requests is to enter or to exit one of a plurality of power-down modes. The first circuit further selects one or more of the cores to enter or to exit the requested power-down mode or modes based on inrush current information associated with the power-down modes. A second circuit is configured to effect entering or exiting the requested power-down mode or modes in the selected one or more of the cores.

20 Claims, 5 Drawing Sheets

(56) References Cited

U.S. PATENT DOCUMENTS

| | | | |
|---|---|---|---|
| 2014/0361819 A1* | 12/2014 | Lundberg | G06F 1/3234 |
| | | | 327/198 |
| 2015/0058650 A1* | 2/2015 | Varma | G06F 1/3293 |
| | | | 713/324 |
| 2015/0169363 A1 | 6/2015 | Anderson et al. | |
| 2015/0253836 A1 | 9/2015 | Mylius et al. | |

FOREIGN PATENT DOCUMENTS

| | | |
|---|---|---|
| EP | 2879017 A2 | 6/2015 |
| EP | 2887181 A1 | 6/2015 |
| WO | 2012170214 A2 | 12/2012 |
| WO | 2014123587 A1 | 8/2014 |

OTHER PUBLICATIONS

International Search Report and Written Opinion—PCT/US2016/049504—ISA/EPO—dated May 24, 2017.

Lai Z., et al., "Latency-aware DVFS for Efficient Power State Transitions on many-core Architectures," Journal of Supercomputing, Kluwer Academic Publishers, Dordrecht, NL, Apr. 5, 2015 (Apr. 5, 2015), vol. 71(7), pp. 2720-2747, XP035506622, ISSN: 0920-8542, DOI: 10.1007/S11227-015-1415-Y [retrieved on Apr. 5, 2015].

* cited by examiner

MANAGING POWER-DOWN MODES

CLAIM OF PRIORITY

The present Application for Patent claims priority to Indian Application Number 4955/CHE/2015, entitled "MANAGING POWER-DOWN MODES" filed Sep. 16, 2015, and assigned to the assignee hereof and hereby expressly incorporated by reference herein.

BACKGROUND

Field

The present disclosure relates generally to electronic apparatus, and more particularly, to method and apparatuses for managing entering or exiting of power-down modes for multiple cores.

Background

A typical electronic apparatus, such as a processor within wireless devices, may include various cores operating within different power domains. A core may vary from a collection of transistors or circuits to an execution unit. Increasingly, the cores may enter or exit power-down modes at various times to manage power consumption. The power-down modes vary and may include a power-collapse mode, in which all power is disconnected from the cores. Other power-down modes may include gating the clocks with the cores (e.g., disabling clocking in the cores). Yet other power-down modes may include adjusting the operating voltages and frequencies of the cores. While the entering and exiting of the power-down modes may conserve power, such changes of power-down modes may lead to various drawbacks. One design challenge is to manage the entering or exiting of the power-down modes for multiple cores and mitigate the drawbacks.

SUMMARY

Aspects of an apparatus are provided. The apparatus includes a first circuit configured to receive one or more requests from a plurality of cores. Each of the one or more requests is to enter or to exit one of a plurality of power-down modes. The first circuit further selects one or more of the cores to enter or to exit the requested power-down mode or modes based on inrush current information associated with the power-down modes. A second circuit is configured to effect entering or exiting the requested power-down mode or modes in the selected one or more of the cores.

Aspects of a method to manage power are provided. The method includes receiving one or more requests from a plurality of cores. Each of the one or more requests is to enter or to exit one of a plurality of power-down modes. The method further includes selecting one or more of the cores to enter or to exit the requested power-down mode or modes based on inrush current information associated with the power-down modes and effecting entering or exiting the requested power-down mode or modes in the selected one or more of the cores.

Aspects of another apparatus are provided. The apparatus includes a first circuit configured to receive a plurality of requests from a plurality of cores. Each of the requests is to enter or to exit a plurality of power-down modes. The first circuit further selects ones of the cores to enter or to exit different power-down modes. A second circuit is configured to effect entering or exiting the requested power-down modes in the selected ones of the cores.

Aspects of another method to manage power are provided. The method includes receiving a plurality of requests from a plurality of cores. Each of the requests is to enter or to exit one of a plurality of power-down modes. The method further includes selecting ones of the cores to enter or to exit the requested power-down modes and effecting entering or exiting the requested power-down modes in the selected ones of the cores.

It is understood that other aspects of apparatus and methods will become readily apparent to those skilled in the art from the following detailed description, wherein various aspects of apparatus and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of apparatus and methods will now be presented in the detailed description by way of example, and not by way of limitation, with reference to the accompanying drawings, wherein.

DETAILED DESCRIPTION

Figure 1:
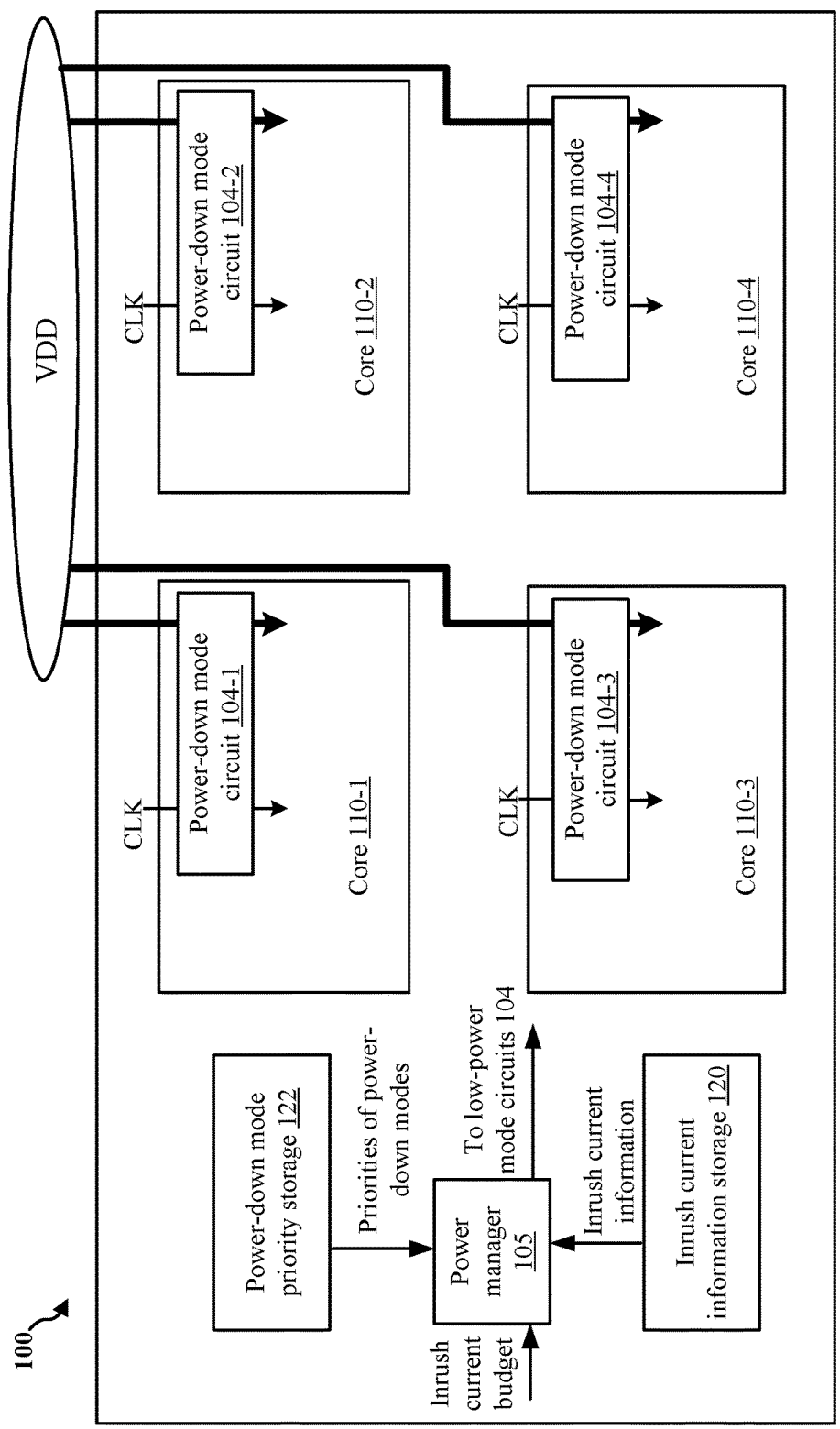
FIG. 1 is a block diagram of an exemplary embodiment of a processor configured to mange entering or exiting of power-down modes for multiple cores based on inrush current information.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

Various apparatus and methods presented throughout this disclosure may be implemented in various forms of hardware. By way of example, any of these apparatus or methods, either alone or in combination, may be implemented as an integrated circuit, or as part of an integrated circuit. The integrated circuit may be an end product, such as a microprocessor, a digital signal processor (DSP), an application specific integrated circuit (ASIC), programmable logic, or any other suitable integrated circuit. Alternatively, the integrated circuit may be integrated with other chips, discrete circuit elements, and/or other components as part of either an intermediate product, such as a motherboard, or an end product. The end product can be any suitable product that includes integrated circuits, including by way of example, a cellular phone, personal digital assistant (PDA), laptop computer, a desktop computer (PC), a computer peripheral device, a multimedia device, a video device, an audio device, a global positioning system (GPS), a wireless sensor, or any other suitable device.

The word "exemplary" is used herein to mean serving as an example, instance, or illustration. Any embodiment described herein as "exemplary" is not necessarily to be construed as preferred or advantageous over other embodiments. Likewise, the term "embodiment" of an apparatus or method does not require that all embodiments of the invention include the described components, structure, features, functionality, processes, advantages, benefits, or modes of operation.

When a "signal" is reference, the term may include the conductor carrying the described signal. The term "connection" may include a signal line. The terms "connected," "coupled," or any variant thereof, mean any connection or coupling, either direct or indirect, between two or more elements, and can encompass the presence of one or more intermediate elements between two elements that are "connected" or "coupled" together. The coupling or connection between the elements can be physical, logical, or a combination thereof. As used herein, two elements can be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element.

As used herein, the singular forms "a," "an" and "the" are intended to include the plural forms as well, unless the context clearly indicates otherwise. It will be further understood that the terms "comprises," "comprising," "includes" and/or "including," when used herein, specify the presence of the stated features, integers, steps, operations, elements, and/or components, but do not preclude the presence or addition of one or more other features, integers, steps, operations, elements, components, and/or groups thereof.

Various aspects of an apparatus with circuits for managing the entering or exiting of power-down modes for multiple cores are provided. An example of such apparatus may be a processor for wireless communication application. In some examples, the apparatus may include a power management circuit configured to select the cores for entering or exiting power-down modes based on inrush current information. In some examples, the power management circuit is configured as a token manager receiving requests from the cores for entering or exiting power-down modes and issuing tokens to the selected cores to grant the requests.

As those skilled in the art will readily appreciate, aspects and applications of the disclosure may not be limited to the described exemplary embodiments. For example, the apparatus of present disclosure is not limited to a processor, and the power management circuit is not limited to the token manger. Accordingly, all references to a specific application are intended only to illustrate exemplary aspects of the memory with the understanding that such aspects may have a wide differential of applications.

FIG. 1 is a block diagram of an exemplary embodiment of a processor 100 configured to mange entering or exiting of power-down modes for multiple cores based on inrush current information. The processor 100 may be, for example, a processor for wireless communication. In some examples, an exemplary apparatus may include the processor 100 or a cell phone incorporating the processor 100. The processor 100 may be a stand along processor or integrated in an end product, such as mobile phone, desktop computer, laptop computer, tablet computer, or the like.

The processor 100 includes cores 110 (110-1, 110-2, 110-3, and 110-4). A core may be, for example, a collection of circuits. In some examples, the cores 110 may be processor or execution units executing instructions. The processor 100 may further include additional function blocks (not shown for clarity) such as a graphic processor unit, a digital signal processors (DSP), a wireless modem, and a wireless local area network or WLAN block interfacing with the cores 110.

Each of the cores 110 may include a power-down mode circuit 104 (104-1, 104-2, 104-3, or 104-4 for each of the cores 110). The power-down mode circuits 104 may effect the corresponding cores 110 to enter or to exit various power-down modes. Thus, the power-down mode circuits 104 may cause the corresponding cores 110 to power up from a power-down mode, to power down to a power-down mode, or to transition among the various power-down modes.

Examples of the power-down modes may include a power-collapse mode, in which all power is disconnected from the cores. Accordingly, the power-collapse mode may draw no current as all power is disconnected. Other power-down modes may include a clock-gating mode that disables clocking in the cores. Yet other power-down modes may include adjusting the operating voltages and frequencies of the cores. The entering and the exiting of the various power-down modes may take different amount of time. For example, entering and exiting the power-collapse mode may take more cycles than the other power-down modes.

The power-down mode circuits 104, as illustrated, may effect the corresponding core 110 to enter into the power-collapse mode or the clock-gating mode (e.g., powering down the core 110). The power-down mode circuit 104 may likewise effect the core 110 to exit the power-down modes and return to full-power operations (e.g., powering up the core 110). In some examples, the power-down mode circuit 104 may effect the corresponding core 110 to transition among the power-collapse mode and the clock-gating mode.

The processor 100 further includes the power manager 105, the inrush current information storage 120, and the power-down mode priority storage 122. The power manager 105 may be configured to select among the cores 110 for entering or exiting power-down modes by selectively controlling the power-down mode circuits 104. In some examples, the power manager 105 may include a processor (such as one of the cores 110) executing software instructions. The power manager 105 may select among the cores 110 based on inrush current information stored in the inrush current information storage 120 and/or the power-down mode priorities stored in the power-down mode priority storage 122. In some examples, the stored inrush current information and/or the power-down mode priorities may be programmable (e.g., changed by software instructions).

The inrush current information storage 120 may be, for example, registers storing inrush current information including inrush current caused by entering or exiting the various power-down modes. The process of entering and exiting the various power-down modes may cause inrush current in the cores 110 to spike, even to the point of exceeding the capability of current supplies to the cores 110. By utilizing the inrush current information associated with the entering and exiting of the various power-down modes, the power manager 105 may determine a number and an order of the cores 110 to be selected for entering or exiting the power-down modes efficiently without causing excessive inrush current.

The power-down mode priority storage 122 may be, for example, registers storing power-down mode priorities. The priorities may be, for example, based on the times to enter or to exit the power-down modes. For example, the power-collapse mode may take the longest to enter or to exit, and therefore, the power-collapse mode may have the lowest priority. In some examples, the priorities may be based on power saving of the power-down modes.

The power manager 105 may further receive an inrush current budget and select the cores 110 based on the inrush current budget. The inrush current budget may be based on the current limit of the power supply (e.g., the power management integrated circuit or PMIC). In some examples, the inrush current budget may be further based on present operations of the cores, even the cores not requesting to enter or to exit the power-down modes. For example, in the cases some of the cores are operating in high performance modes (thus consuming more power), the inrush current budget may be reduced.

Figure 2:
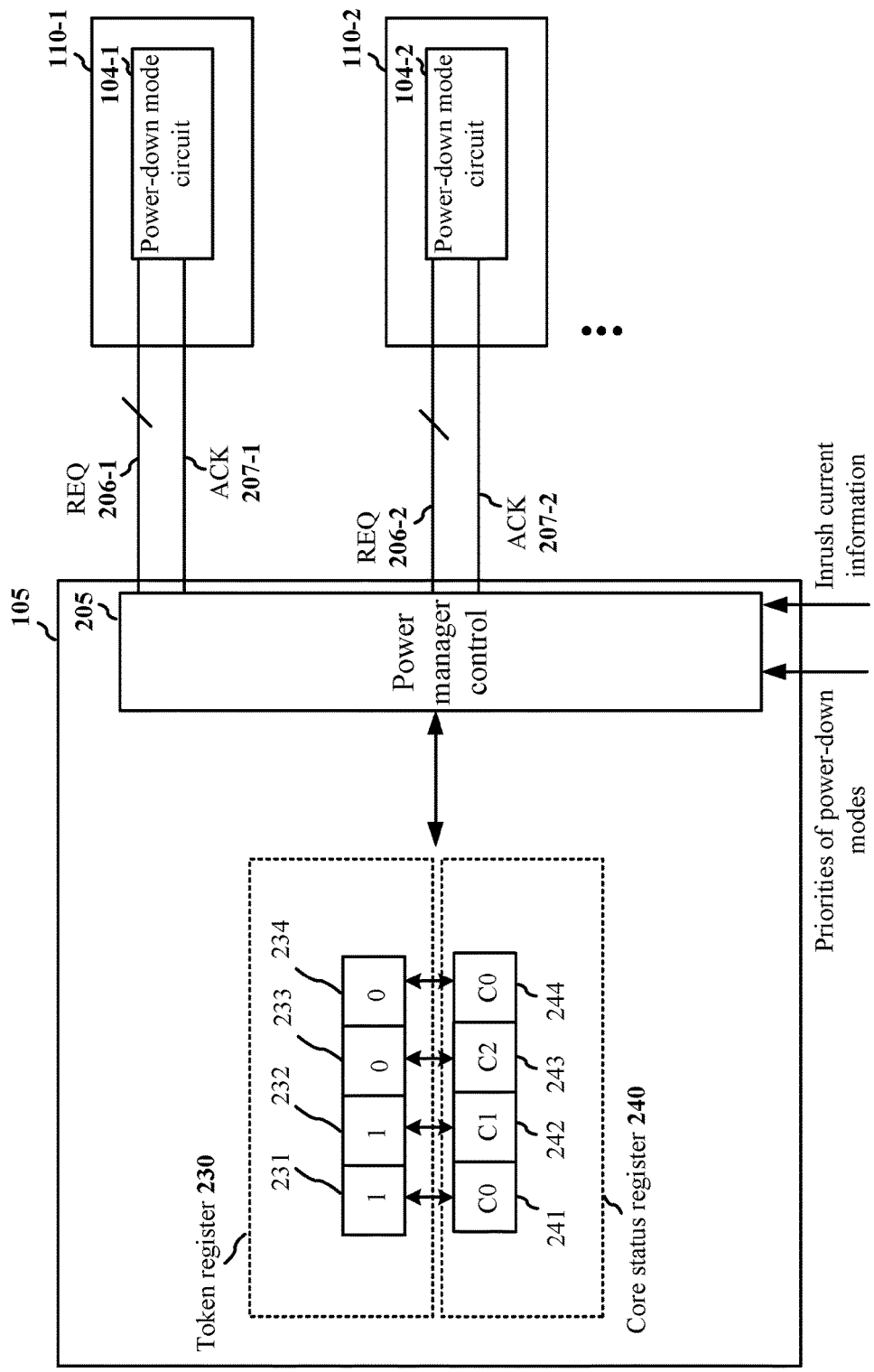
FIG. 2 is a block diagram of an exemplary embodiment of the power manager of FIG. 1 operating as a token manager.

FIG. 2 is a block diagram of an exemplary embodiment of the power manager 105 of FIG. 1 operating as a token manager. A token may be a signaling indicating a grant or allowance to enter or exit power-down modes. The power manager 105 includes a power manager control 205 configured to receive one or more requests to enter or to exit power-down modes from the cores 110 (core 110-1 to core 110-4). Each of the one or more requests indicates that one of the cores wishes to enter or to exit one of the power-down modes.

The multiple cores 110 may send the requests to enter or to exit the power-down modes independently and in parallel. For example, the core 110-1 may request a power-up from a power-collapse mode. The core 110-2 may request a power-down from a full-power operation to a clock-gating mode. The 110-3 may request transitioning from the power-collapse mode to the clock-gating mode, and so forth. All the requests may be made at the same time. As described above, enacting all the requests to enter or to exit the power-down modes in the multiple cores 110 may cause the inrush current to spike. Accordingly, the power manager control 205 may be further configured to select one or more of the cores 110 to grant to tokens so as not to cause the inrush current to spike exceeding an inrush current threshold (e.g., the inrush current budget). Additional features of this selection process are presented with FIGS. 4-5.

The process of requesting and granting the token is described below. The power manager 105 (e.g., the power manager control 205) communicate with the cores 110 via the signaling REQ 206 (206-1 to 206-4 for each of the cores 110) and the signaling ACK 207 (207-1 to 207-4 for each of the cores 110). To request permission to enter or exit power-down modes, each of the cores 110 may independently and in parallel request a token from the power manager 105 by asserting the signaling REQ 206. In some examples, the signaling REQ 206 may be carried by multiple signals lines to indicate the desired action and the desired resulting power-down mode (e.g., indicating the desire to exit from the current power-down mode to a full-power operation, to enter a desired power-down mode, the identity of the desired power-down mode, etc.).

The power manager 105 (e.g., the power manager control 205) receives the signaling REQ 206. For example, the signaling REQ 206 is provided as input to logic gates or components within the power manager control 205. To grant the token, the power manager 105 asserts the signaling ACK 207 (207-1 to 207-4 for each of the cores 110). In response to the assertion, the power-down mode circuits 104 of the selected cores 110 effect the requested power-down actions (e.g., to enter or to exit power-down modes). Upon a completion of the requested power-down action, the power-down mode circuit 104 de-asserts both the signaling REQ 206 (to terminate the request) and the signaling ACK 207 (to indicate a completion of the requested power-down action).

The power manager 105 further includes the token register 230 and the core status register 240 to manage the requests and the tokens. The token register 230 includes multiples bits (231 to 234), each of which corresponds to one of the cores 110. The bits 231-234 indicate that a request for token from the corresponding cores 110 is active. For example, the bit 231 stores the value "1" to indicate that the corresponding core 110-1 is requesting a token (e.g., the signaling REQ 206-1 is asserted). The bits 233 and 234 store the value "0" to indicate that the corresponding cores 110-3 and 110-4 are not requesting a token (e.g., the signaling REQ 206-2 to 206-4 are de-asserted).

The core status register 240 stores the current power-modes of the cores. The core status register 240 includes bits 240-1 to 240-4, each of which corresponds to one of the cores 110. For example, the bit 240-1 stores the value C0, indicating that the core 110-1 is in the full-power operation state. The 240-2 stores the value C1, indicating that the core 110-2 is in the power-collapse mode. The 240-3 stores the value C2, indicating that the core 110-2 is in clock-gating mode, and so forth. Via the token register 230 and the core status register 240, the power manager 105 is able to keep track the current states of token requests and status of each of the cores 110 (e.g., full-power operation state or one of the power-down modes).

Figure 3:
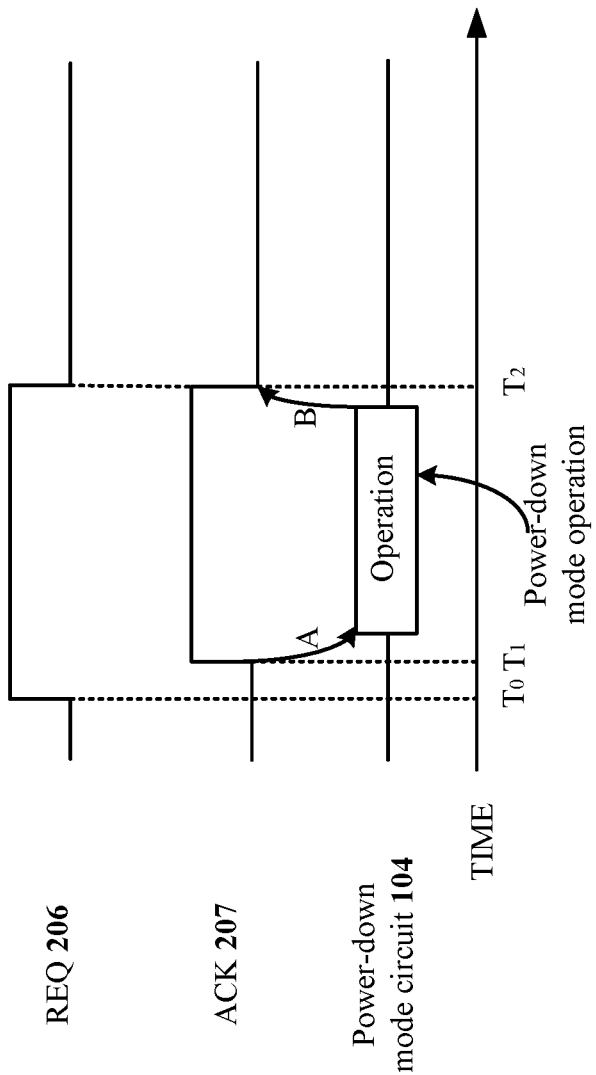
FIG. 3 is a timing diagram of the operations of requesting and granting tokens.

FIG. 3 is a timing diagram of the operations of requesting and granting tokens. At $T_0$, one or more of the cores 110 request a token to enter or to exit power-down modes by asserting (e.g., pulling high) the signaling REQ 206. At $T_1$, the power manager 105 (e.g., the power manager control 205) issues a token to the selected core or cores 110 by asserting (e.g., pulling high) the signaling ACK 207. In response, a power-down mode circuit 104 of the selected core or cores effect the requested power-down mode operation. For example, the power-down mode circuit 104 causes the corresponding core 110 to power up to the full-power operation state, to power down to one of the power-down modes from the full-power operation state, or to transition among the power-down modes (at A). At B, the requested power-down mode operation is completed. In response, the power-down mode circuit 104 notifies the power manager 105 the release of the token by de-asserting (e.g., pulling low) both the signaling REQ 206 and the signaling ACK 207.

Figure 4:
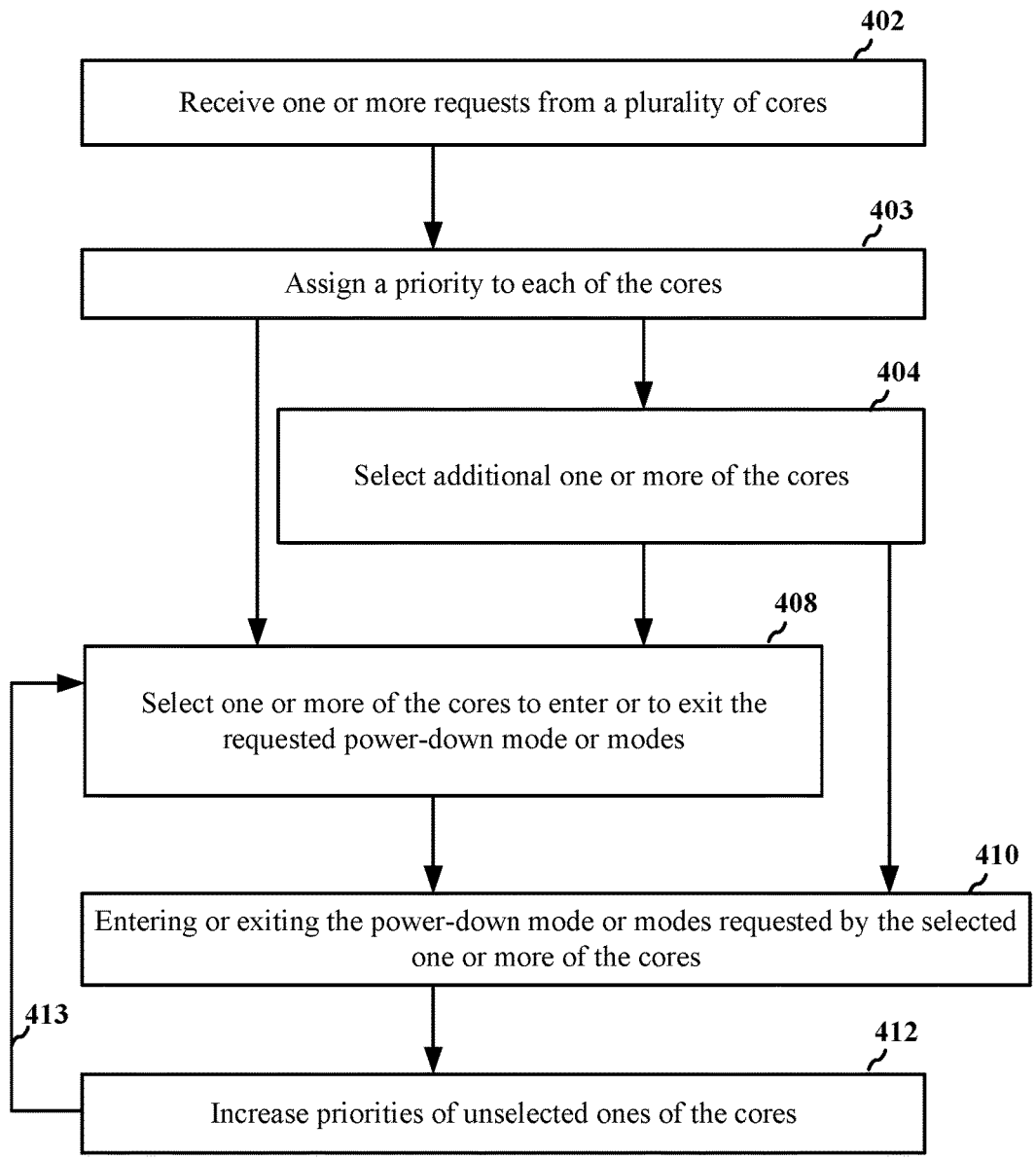
FIG. 4 is a flowchart of operations of an exemplary embodiment of the power manager control selecting one or more cores to grant requests.

FIG. 4 is a flowchart of operations of an exemplary embodiment of the power manager control 205 selecting one or more cores 110 to grant requests. In some examples, the operations may be performed by the power manager control 205. At 402, one or more requests from a plurality of cores are received. In some examples, the power manager control 205 receives the requests by providing the signaling REQ 206 as input to logic gates or components within the power manager control 205. In some examples, each of the one or more requests is a request to enter or to exit one of a multiple of power-down modes. Referring to FIG. 2, for example, the power manager control 205 receives token requests from the cores 110 (110-1 to 110-4) by receiving the low state of the signaling REQ 206-1 and the signaling REQ 206-2. The power manager control 205 then saves the requests in the token register 230 by storing "1"s in the bits 231 and 232, indicating respectively that the core 110-1 and 110-2 are requesting to enter or to exit at least one of the power-down modes.

The power-down modes vary and may include a power-collapse mode, in which all power is disconnected from the cores. Other power-down modes may include gating the clocks with the cores (e.g., disabling clocking in the cores). Yet other power-down modes may include adjusting the operating voltages and frequencies of the cores. The requests to enter or to exit the power-down modes may include, for example, powering-up the requesting core by exiting one of the power-down modes to a full-power operation state and powering-down the requesting core by entering one of the power-down modes from a full-power operation state. Such requests may also include transitioning among the various power-down modes.

At 403, a priority is assigned to each of the cores. Referring to FIG. 1, for example, the assignment may be based on the power-down modes requested by the cores 110 and the power-down mode priorities stored within the power-down mode priority storage 122. The priorities may be, for example, based on the times to enter or to exit the power-down modes. For example, the power-collapse mode may take the longest to enter or to exit, and therefore, the power-collapse mode may have the lowest priority. Referring to FIG. 2, for example, the power manager control 205 may assign priorities to the cores 110 based on the states of the cores stored in the core status register 240 and the power-down modes indicated by the signaling REQ 206.

At 404, additional one or more of the cores are selected. The additional one or more of the cores are in reference and in addition to the cores selected at 408. In some examples, in order to grant the requests to enter or to exit the power-down modes quickly, the power manager control 205 may fast-track the selection of cores 110 for granting requests independent of the power-down modes. In some examples, the power manager control 205 may select the cores based on predetermine priorities not based on the power-down modes. For example, the predetermine priorities may be a fixed order of core 110-1, core 110-2, core 110-3, and core 110-4. In some examples, the fast-tracked selection is determined to be within an inrush current budget by selecting only one core. The inrush current budget may be based on the current limit of the power supply (e.g., PMIC). In some examples, the inrush current budget may be further based on present operations of the cores, even the cores not requesting to enter or to exit the power-down modes. For example, in the cases some of the cores are operating in high performance modes (thus consuming more power), the inrush current budget may be reduced.

At 408, one or more of the cores are selected to enter or to exit the requested power-down mode or modes. In some examples, the selection may be based on the priorities assigned in operation 403. In some examples, the selection may be further based on inrush current information associated with the power-down modes. For example, the inrush currents of the highest priorities are compared with the inrush current budget to allow a maximum selection of cores without exceeding the current budge. In such fashion, the number of the selected cores may be determined.

For example, the selection of cores 110 allows for granting the maximum number of requests from the highest priority cores 110 (e.g., the cores 110 requesting to enter or to exit the power-down modes of highest priorities) within the inrush current budget. Such selection may be made using the inrush current information of the highest priority cores 110. The remaining inrush current budget may be utilized by selecting cores 110 of lower priorities (e.g., requesting to enter or exit power-down modes of lower priories) requiring inrush currents within the remaining inrush current budget. In such fashion, the core or cores 110 requesting to enter or to exit a first power-down mode and the core or cores 110 requesting to enter or to exit a second, different power-down mode may be selected concurrently. In some examples, "concurrently" may stand for selecting and/or granting requests for entering or exiting different power-down modes at substantially the same time. In some examples, "concurrently" may stand for selecting and/or granting requests for entering or exiting different power-down modes with substantial, nontrivial overlaps as understood by persons of ordinary skill in the art.

At 410, the power-down mode or modes requested by the selected one or more of the cores are entered or exited. For example, referring to FIGS. 1 and 2, the power-down mode circuits 104 of the selected cores 110 (e.g., from operations 404 and 408) may cause the selected cores 110 to enter the requested power-down modes or to exit the current power-down mode.

At 412, priorities of unselected ones of the cores are increased. In some example, when one of the cores selected completes the entering or exiting the power-down modes, the inrush current budget may be increase. In response, the power manager control 205 may return to 408 (via operation 413) to select another core or cores to grant requests. Increasing the priorities of the unselected cores, which may be of lower priorities to start with, prevents starvation of these cores.

Figure 5:
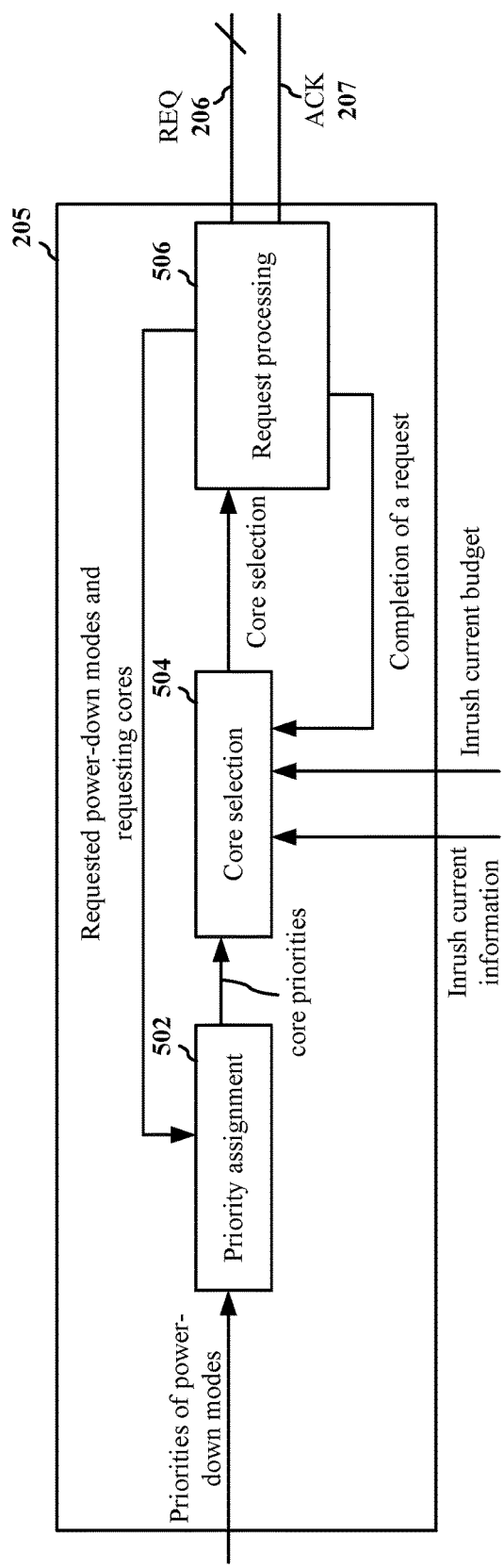
FIG. 5 is a block diagram of an exemplary embodiment of the power manager control.

FIG. 5 is a block diagram of an exemplary embodiment of the power manager control 205. The block diagram may be an exemplary embodiment of a hardware implementation of the power manager control 205 and may include various (e.g., hardware and/or software) components. In some examples, theses components described below may include instructions executed by one of the cores 110-1-110-4.

In an exemplary embodiment, the power manager control 205 and the components contained therein, presented below, may include circuits, processor or processors, software executing on the processor or processors, or combinations thereof. These components may include circuits for generating the signals for the functions described infra or signal lines carrying those signals.

By way of example, a component, or any portion of a component, or any combination of components may be implemented with one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The power manager control 205 includes the priority assignment component 502, the core selection component 504, and the request processing component 506. The priority assignment component 502 receives the requested power-down modes (to enter or to exit from) and the requesting cores 110 from the request processing component 506. The priority assignment component 502 further receives the power-down mode priorities from the programmable power-down mode priority storage 122. In some examples, the priority assignment component 502 assigns priorities to the cores based on the power-down mode priorities (which, for example, may be based on the time to enter or exit the power-down modes)(e.g., operation 403). In some examples, the priority assignment component 502 may increase the priorities of the unselected cores so as not to starve the unselected cores (e.g., operation 412).

The core selection component 504 receives the assigned priorities of the requesting cores from the priority assignment component 502. The core selection component 504 also receives the inrush current information and the inrush current budget. In some examples, the inrush current information may include the inrush current consumed to enter or to exit each of the power-down modes. The inrush current information may be received from the inrush current information storage 120 and may be programmable by software. The inrush current budget may be a limit based on the power supplied (e.g., the PMIC). The inrush current budget may further be adjusted based on the present operations of the cores 110. For example, some of the cores 110 may be engaging the current-consuming operations such that the inrush current budget is reduced.

In some examples, the core selection component 504 takes in all the requests and tries to accommodate the maximum number of requests concurrently abiding by the inrush current budget. For example, the core selection component 504 may grant the maximum number of requests from the highest priority cores 110 (e.g., the cores 110 requesting to enter or to exit the power-down modes of highest priorities) within the inrush current budget. Such determination may be made using the inrush current information of the highest priority cores 110. The core selection component 504 may further utilize the remaining inrush current budget by selecting cores 110 of lower priorities (e.g., requesting to enter or exit power-down modes of lower priories) requiring inrush currents within the remaining inrush current budget. In such fashion, the core selection component 504 may select concurrently the core or cores 110 requesting to enter or to exit a first power-down mode and the core or cores 110 requesting to enter or to exit a second, different power-down mode. Accordingly, the core selection component 504 is configured to select the one or more of the cores 110 to grant the power-down mode requests based on an the inrush current budget. Moreover, the number of the one or more of the cores 110 selected is based on the inrush current budget. See, for example, operation 408.

In some examples, the core selection component 504 may select requesting cores 110 independent of the power-down modes to expedite the selection process. For example, the core selection component 504 may utilize priorities independent of the power-down modes, such as a fixed order core 110-1, core 110-2, core 110-3, and then core 110-4. To ensure that the selection of cores 110 independent of the power-down modes is within the inrush current budget, a limited number (e.g., one) of the cores 110 may be selected in this fashion. See, e.g., operation 404. The core selection component 504 may in parallel or subsequently proceed with the selection of the requesting cores 110 based on the power-down modes (operation 408).

The core selection component 504 receives notification of a completion of one of the selected cores 110 from the request processing component 506. In response, the core selection component 504 may perform the selections described above of the unselected cores 110 and new requesting cores 110. The unselected cores 110 may have increased priorities from the previous selection so as not to starve those cores 110.

The request processing component 506 interfaces with cores 110 via the signaling REQ 206 and the signaling ACK 207 to receive requests and to grant requests to enter or to exit power-down modes. To grant requests, the request processing component 506 receives the core selection from the core selection component 504. Upon a completion of one of the requests, the request processing component 506 sends the notification to the core selection component 504.

The specific order or hierarchy of blocks in the method of operation described above is provided merely as an example. Based upon design preferences, the specific order or hierarchy of blocks in the method of operation may be re-arranged, amended, and/or modified. The accompanying method claims include various limitations related to a method of operation, but the recited limitations are not meant to be limited in any way by the specific order or hierarchy unless expressly stated in the claims.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f) unless the element is expressly recited using the phrase "means for" or, in the case of a method claim, the element is recited using the phrase "step for."

What is claimed is:

1. An apparatus, comprising:
   a first circuit configured to
      receive one or more requests from a plurality of cores, each of the one or more requests being to enter or to exit one of a plurality of power-down modes;
      assign a priority to each of the cores based on priorities of the power-down modes;
      select one or more of the cores to enter or to exit the requested power-down mode or modes based on inrush current information associated with the power-down modes and based on the assigned priorities; and a second circuit configured to effect entering or exiting the requested power-down mode or modes in the selected one or more of the cores.

2. The apparatus of claim 1, wherein the first circuit is further configured to select additional one or more of the cores independent of the power-down modes, and wherein the second circuit is further configured to effect entering or exiting the power-down mode or modes requested by the additional one or more of the cores.

3. The apparatus of claim 2, wherein the first circuit is further configured to select the additional one or more of the cores based on priorities independent of the power-down modes and within an inrush current budget.

4. The apparatus of claim 1, wherein the first circuit is further configured to select the one or more of the cores based on an inrush current budget.

5. The apparatus of claim 4, wherein a number of the one or more of the cores selected is based on the inrush current budget.

6. The apparatus of claim 1, wherein the priorities of the power-down modes are programmable.

7. The apparatus of claim 1, wherein the first circuit is further configured to increase the priorities of unselected ones of the cores, and configured to select another one or more of the cores based on the increased priorities of the unselected ones of the cores.

8. The apparatus of claim 1, wherein the inrush current information associated with the power-down modes is programmable.

9. An method to manage power, comprising
receiving one or more requests from a plurality of cores, each of the one or more requests being to enter or to exit one of a plurality of power-down modes;
assigning a priority to each of the cores based on priorities of the power-down modes;
selecting one or more of the cores to enter or to exit the requested power-down mode or modes based on inrush current information associated with the power-down modes and based on the assigned priorities; and
entering or exiting the requested power-down mode or modes in the selected one or more of the cores.

10. The method of claim 9, further comprising
selecting additional one or more of the cores independent of the power-down modes; and
entering or exiting the power-down mode or modes requested by the additional one or more of the cores.

11. The method of claim 10, wherein the selecting the additional one or more of the cores is based on priorities independent of the power-down modes and within an inrush current budget.

12. The method of claim 9, wherein the selecting the one or more of the cores is based on an inrush current budget.

13. The method of claim 12, wherein a number of the one or more of the cores selected is based on the inrush current budget.

14. The method of claim 9, wherein the priorities of the power-down modes are programmable.

15. The method of claim 9, further comprising
increasing the priorities of unselected ones of the cores; and
selecting another one or more of the cores based on the increased priorities of the unselected ones of the cores.

16. The method of claim 9, wherein the inrush current information associated with the power-down modes is programmable.

17. An apparatus, comprising:
a first circuit configured to
receive a plurality of requests from a plurality of cores, each of the requests being to enter or to exit one of a plurality of power-down modes; and
assign a priority to each of the cores based on priorities of the power-down modes;
select ones of the cores to enter or to exit different power-down modes concurrently based on inrush current information associated with the power-down modes and based on the assigned priorities; and
a second circuit configured to effect entering or exiting the requested power-down modes in the selected ones of the cores.

18. The apparatus of claim 17, wherein the first circuit is further configured to select the ones of the cores to enter or to exit different power-down modes concurrently based on an inrush current budget.

19. An method to manage power, comprising
receiving a plurality of requests from a plurality of cores, each of the requests being to enter or to exit one of a plurality of power-down modes;
assigning a priority to each of the cores based on priorities of the power-down modes;
selecting ones of the cores to enter or to exit different power-down modes concurrently based on inrush current information associated with the power-down modes and based on the assigned priorities; and
entering or exiting the requested power-down modes in the selected ones of the cores.

20. The method of claim 19, wherein the selecting the ones of the cores to enter or to exit different power-down modes concurrently is based on an inrush current budget.

* * * * *